United States Patent
Reh et al.

[11] Patent Number: 6,032,977
[45] Date of Patent: *Mar. 7, 2000

[54] GAS BAG

[75] Inventors: Stefan Reh, Wörth; Norbert Müller, Aschaffenburg; Ulrich Tachaschke, Ehningen; Bernhard Holzapfel, Remshalden, all of Germany

[73] Assignee: Daimler-Chrysler Aktiengesellschaft, Stuttgart, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/847,384

[22] Filed: Apr. 24, 1997

[30] Foreign Application Priority Data

Apr. 24, 1996 [DE] Germany ............... 296 08 055 U
Feb. 4, 1997 [EP] European Pat. Off. ............... 97250024

[51] Int. Cl.⁷ .................................................. B60R 21/24
[52] U.S. Cl. .................... 280/729; 280/730.2; 280/743.1
[58] Field of Search .............................. 280/743.2, 743.1, 280/730.2, 729

[56] References Cited

U.S. PATENT DOCUMENTS

| | | | |
|---|---|---|---|
| 3,788,665 | 1/1974 | Noll et al. | 280/150 AB |
| 3,897,961 | 8/1975 | Leising et al. | 280/150 AB |
| 5,160,164 | 11/1992 | Fischer et al. | 280/743 |
| 5,362,101 | 11/1994 | Sugiura et al. | 280/743 A |
| 5,464,250 | 11/1995 | Sato | 280/743.1 |
| 5,586,782 | 12/1996 | Zimmermann, II et al. | 280/730.2 |

FOREIGN PATENT DOCUMENTS

| | | |
|---|---|---|
| 0496566 | 7/1992 | European Pat. Off. . |
| 0600598 | 6/1994 | European Pat. Off. . |
| 4430412 | of 0000 | Germany . |
| 29518651 | 4/1996 | Germany . |
| 4443027 | 6/1996 | Germany . |
| 3281460 | 3/1990 | Japan . |
| WO9103391 | 3/1991 | WIPO . |

Primary Examiner—Eric Culbreth
Attorney, Agent, or Firm—Christie, Parker & Hale, LLP

[57] ABSTRACT

A gas bag for a side airbag module which is inflatable by means of a filling device and which consists of at least two chambers in communication with each other. A check strip is provided as a wall between the two respective chambers. The check strip is attached by its edges to opposite surfaces of the gas bag. The ends of the strip do not extend to the periphery of the gas bag allowing the chambers to communicate with each other and thereby allowing gas to pass from one chamber to the other. When the gas bag is inflated, the check strip has a path running at least partially deviating from a straight line. The edges of the strip may also run in different directions. As a result, the gas bag may be simply subdivided into chambers of different size and shape. Consequently, the shape of the inflated gas bag is influenced.

26 Claims, 9 Drawing Sheets

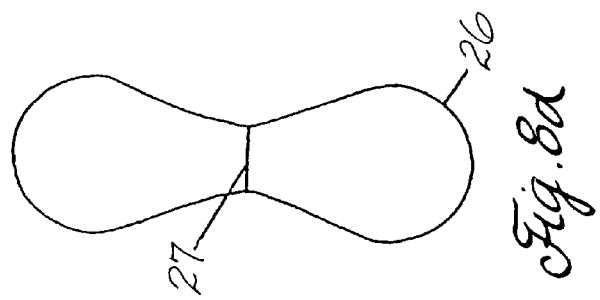
Fig. 8d
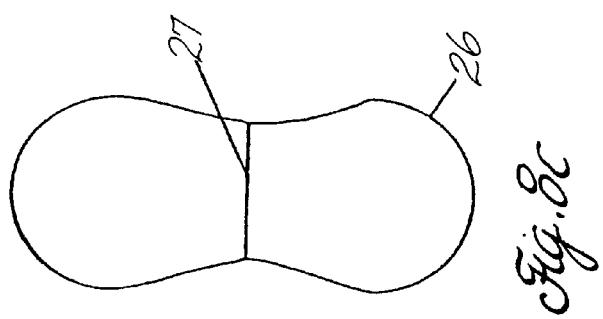
Fig. 8c
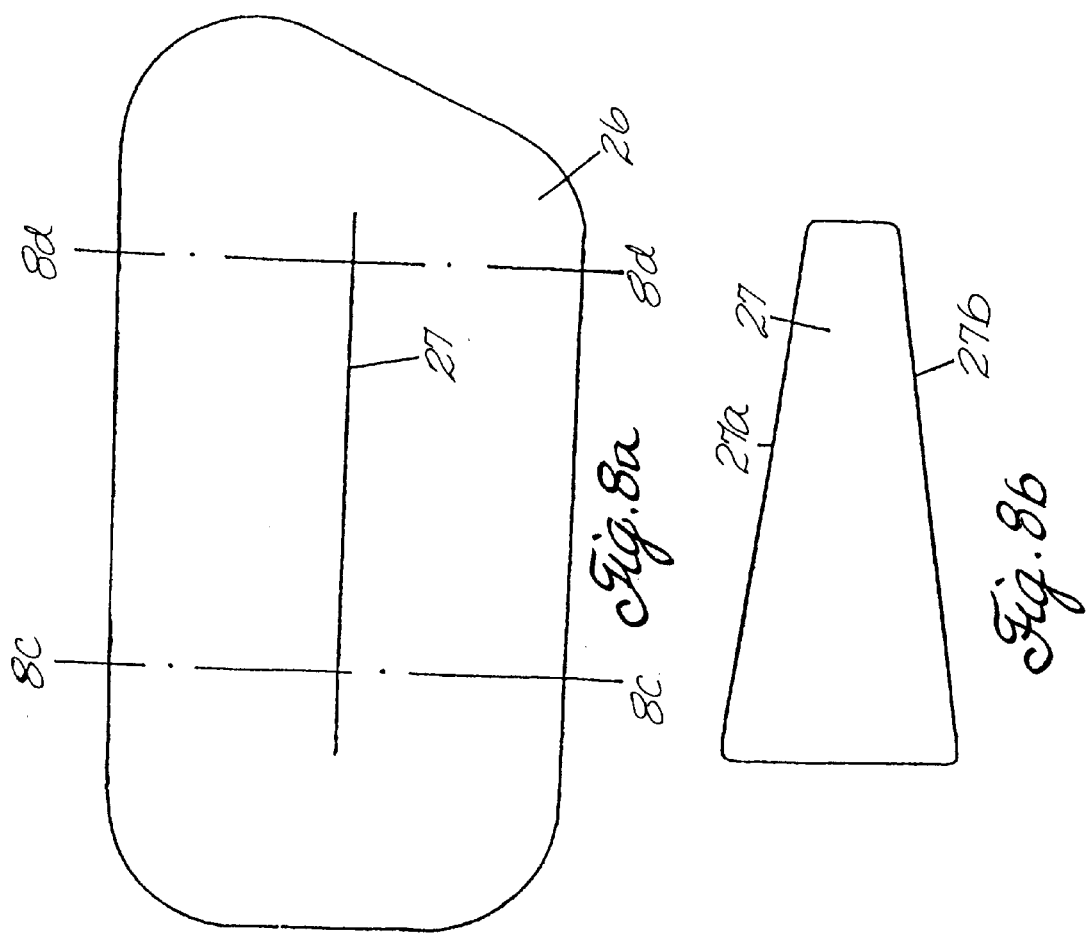
Fig. 8a
Fig. 8b

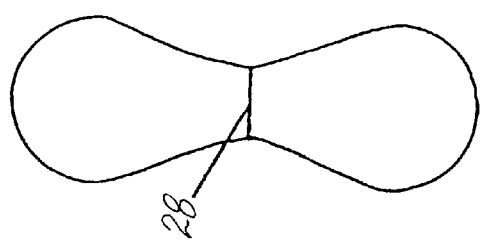
Fig. 9d
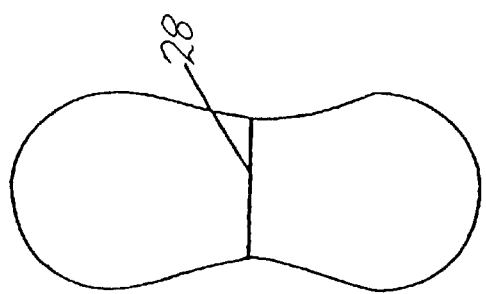
Fig. 9c
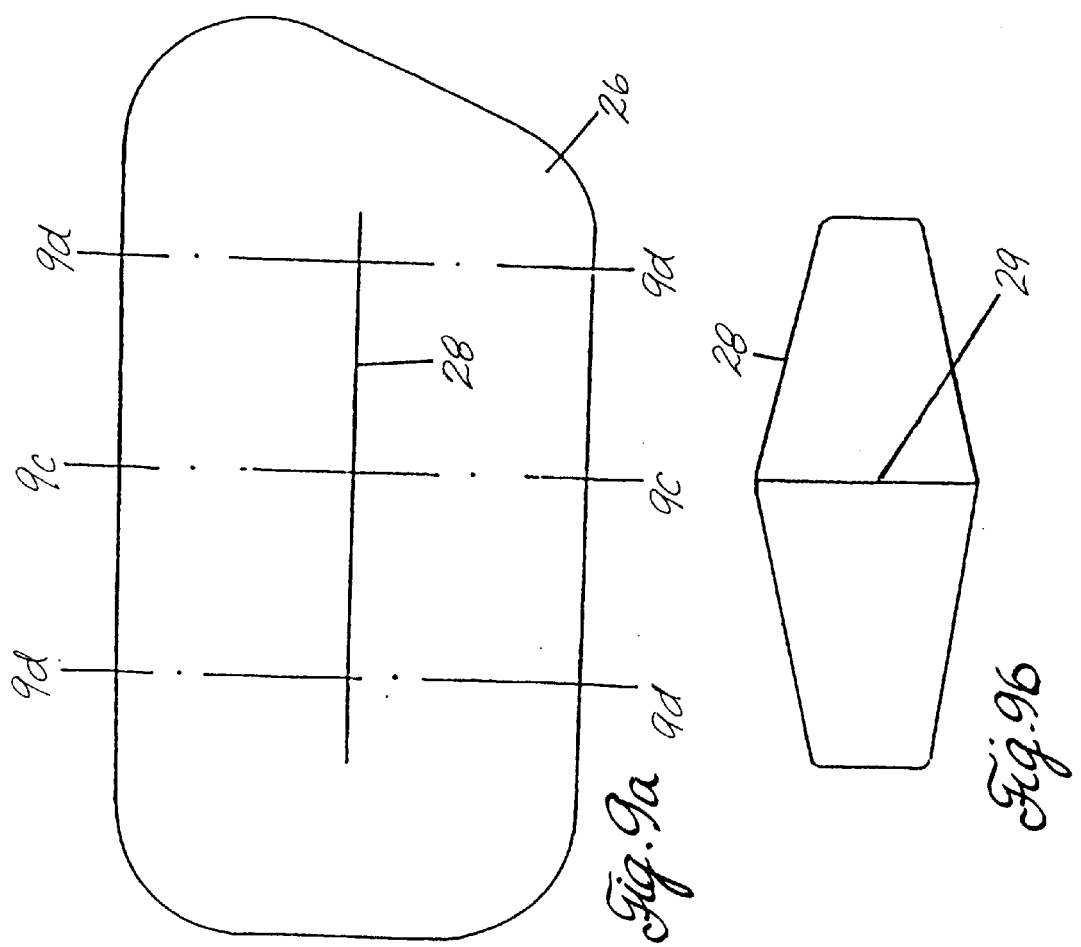
Fig. 9a
Fig. 9b

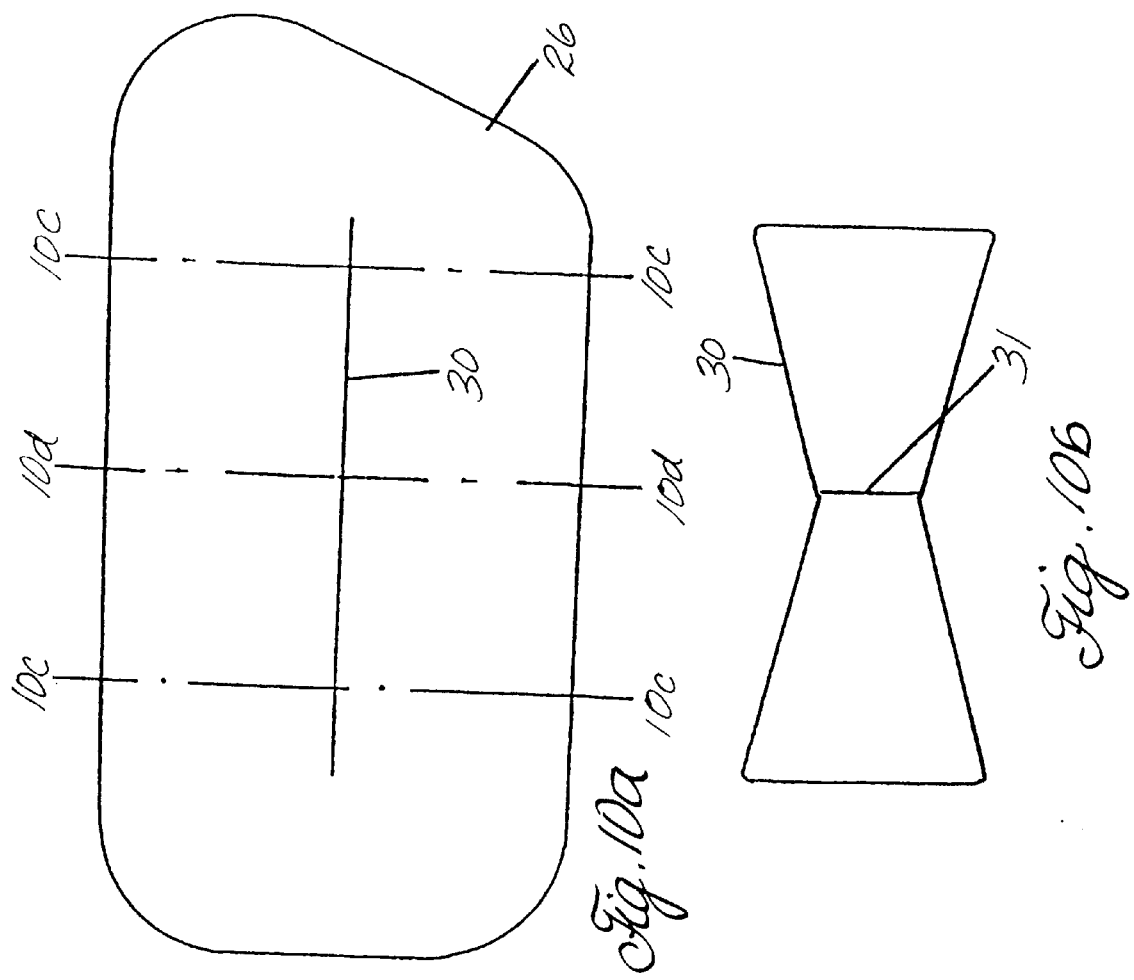

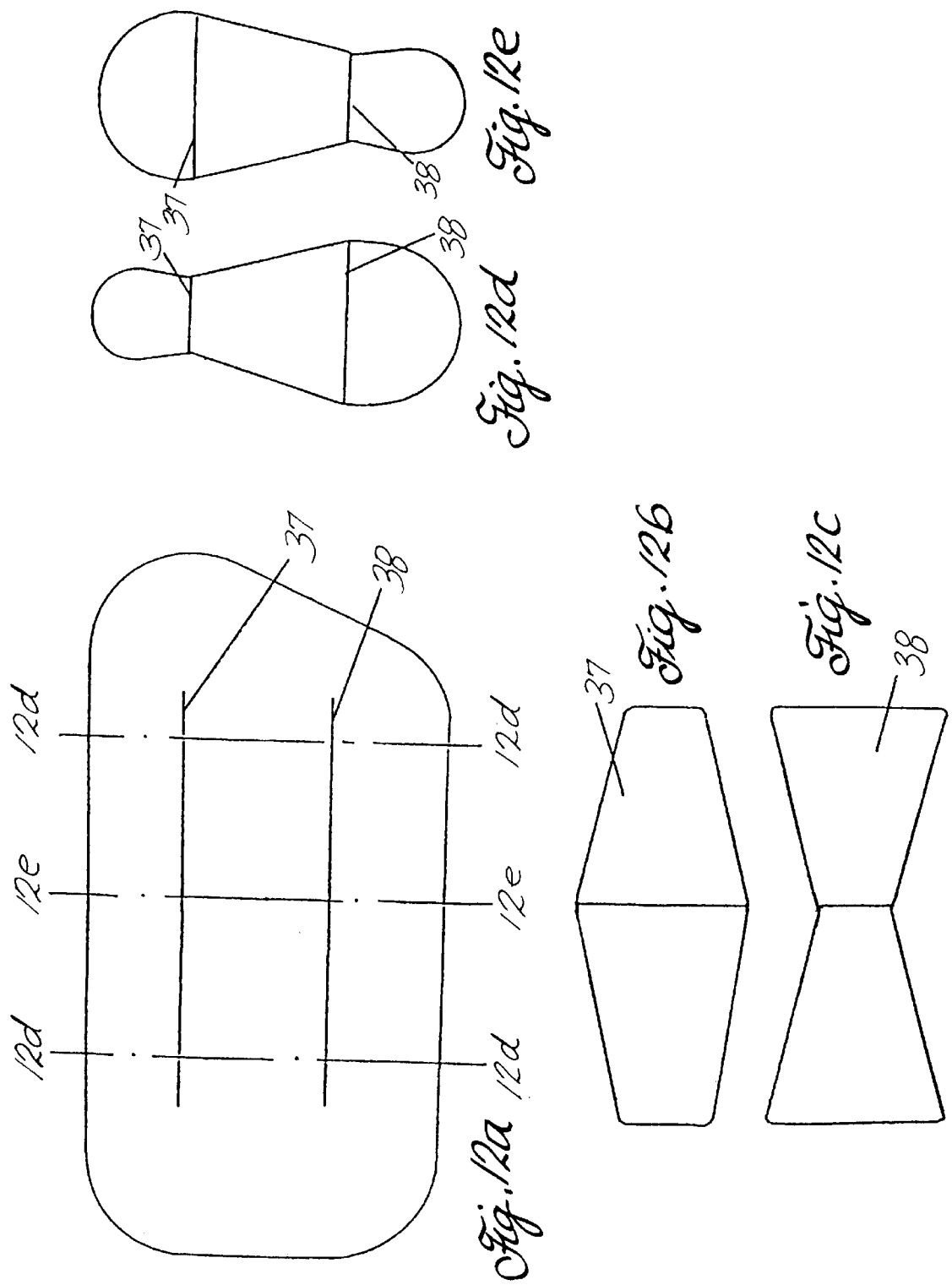

GAS BAG

BACKGROUND OF THE INVENTION

The invention relates to a gas bag, and in particular to a gas bag for use in a side airbag module.

From German Patent DE 44 30 412 C1, a side crash protection device having a gas bag with a filling device for an occupant of a motor vehicle is known. In this device, check strips are provided inside the gas bag which subdivide the gas bag into at least two chambers. The gas bag is inflated by an inflation device connected to one of the chambers. Typically, a plurality of check strips located in proximity to each other are present between two chambers. The check strips are attached to the gas bag opposite each other, i.e., a first strip is attached to an upper surface of the gas bag while another strip is attached to a lower surface of the gas bag opposite and in alignment to the first strip. Open gaps are formed between opposite adjacent check strips or the opposite adjacent check strips may be connected by rupturable seams. These seams rupture upon the filling of the gas bag such that a gap is also produced between these check strips.

This type of subdivision of the two chambers of the gas bag from each other is expensive, since a plurality of check strips must be attached to the airbag to form two chambers in the gas bag.

From U.S. Pat. No. 5,464,250, an airbag is known wherein a check strip zig-zags through the airbag. The check strip is alternatingly attached to the top and the bottom surfaces of the airbag, such that it subdivides the airbag into a plurality of chambers. The zig zagged check strip has openings through which the chambers are in communication with each other.

This type of arrangement of a check strip has the disadvantage that the size and shape of the chambers can be altered only to a limited extent by changing the angle of inclination of the section of the check strip between the top and the bottom of the airbag.

Also known, from German Patent DE 44 43 027 A1, is a gas bag which is divided into two chambers by a flexible partition inside the gas bag. The partition extends the entire length or width and depth of the gas bag and it has an opening for connection of the two chambers. The partition runs in a straight line when the bag is inflated.

With both U.S. Pat. No. 5,464,250 and DE 44 43 027 A1, there is the disadvantage in that the check strip requires additional openings for communication between the chambers.

SUMMARY OF THE INVENTION

Briefly an embodiment of the invention is a gas bag which is inflatable by means of a filling device and which consists of at least two chambers connected with each other, and at least one check strip is provided as a wall between the at least two chambers, the at least one check strip having ends between longer side edges and being attached on one each of longer side edge to opposite surfaces of the gas bag. In the inflated state of the gas bag the side edges of the at least one check strip is attached to the gas bag surfaces along a course running at least partially deviating from a straight line or run in different directions, and that the ends of the at least one check strip are spaced from the gas bag.

Another embodiment of the invention is a gas bag for use in a side airbag module. A filling device inflates the airbag. The airbag has an upper surface and a lower surface. A check strip subdivides the gas bag into chambers. The check strip does not extend to the periphery of the gas bag. As such, the chambers are in communication with each other. The embodiment of this invention is simpler to manufacture, and allows chambers of different shape and size to be simply obtained.

In another embodiment, the check strip has upper and lower edges which are respectively attached to upper and lower surfaces of the gas bag. The check strip is attached to the gas bag such that its path deviates from a straight line (e.g., it curves) and/or such that its opposite edges run in different directions in the plane of the check strip. As a result, the gas bag can be subdivided simply into chambers of different size and shape, thereby, influencing the shape of the inflated gas bag.

In a gas bag according to the present invention, no openings need to be present in the check strip to allow for communication between adjacent chambers. Moreover, with a gas bag of the present invention a plurality of check strips are not required for defining a gap for allowing for a delayed yet rapid filling of the second chamber. Instead, satisfactory filling of the second chamber is possible even with only one check strip forming a chamber wall, which allows for flow from one chamber to another around the ends of the check strip. Moreover, it is easier to attach a single check strip to a gas bag than a plurality of check strips which require alignment relative to each other.

By varying the spacing between the check strip ends and the gas bag periphery, the cross sectional area of the opening through which the chambers communicate are varied allowing for controlling the delay time after which the second chamber is inflated after inflation of the first chamber, which is connected to an inflation device, has begun.

The check strip ends are preferably curved. This curvature increases the stability of the ends and influences the shape of the chamber. Furthermore, it is preferred that the edges of the check strip are continuously attached to the gas bag.

In one embodiment, the check strip runs parallel to the longitudinal direction of the motor vehicle and subdivides the gas bag into two chambers, the first of which is connected to the filling device. The check strip ends are preferably curved toward the second chamber.

The shape and size of adjacent chambers may be varied by attaching the edges of the check strip to the upper and lower surfaces of the gas bag along a curved path.

With the arrangement of more than two chambers, one or a plurality of check strips may be provided to subdivide them. A check strip is needed between two adjacent chambers. By way of contrast, one prior art system which uses more than one check strip, uses multiple check strips between adjacent chambers.

To form more than two chambers, a provision is made in one embodiment that the check strip is attached to the gas bag along a V-shaped path. In such case, three chambers, which are sequentially inflated one after another, are formed in the gas bag. A still more extensive subdivision of the gas bag is possible by attaching the check strip to the gas bag along a zig-zag path.

It is also possible to influence the shape of the inflated gas bag by attaching the check strip to the gas bag such that the strip's upper edge runs in a different direction than the strip's lower edge. Whereas with parallel edges, the adjoining sides of the gas bag run parallel after inflation, that is not always advantageous, in particular with side airbags. With side airbags, the inflated gas bag must be particularly adapted to the structural surroundings, for example, to the space between the automobile seat and the center pillar.

Thus, in one embodiment a trapezoidal check strip used. With the incorporation of a trapezoidal check strip, the thickness of the inflated gas bag varies between the ends of the check strip, allowing the inflated gas bag to be adapted to the space available.

In another form of this embodiment, a provision is made that the check strip has the shape of a double trapezoid, whereby the two trapezoids share one of the parallel trapezoid sides. In this embodiment, the thickness of the inflated gas bag increases or decreases continuously from the common side out to the ends of the check strip depending on whether the double trapezoid is wider or narrower in the center than on its ends.

In another embodiment, a single check strip having sections of different shapes is used. In a further embodiment, a plurality of check strips are used having different shapes. It is thus possible for the gas bag in the inflated state to be even better adapted for extremely varied spatial relationships.

In a preferred embodiment, the gas bag consists of a plate-shaped top (upper) and bottom (lower) part, between which at least one check strip is attached.

DESCRIPTION OF THE DRAWINGS

FIG. 8a is a top view of an unfolded gas bag having a trapezoidal check strip.

FIG. 8b is a side view of the trapezoidal check strip of FIG. 8a.

FIGS. 8c and 8d are cross-sectional views of the inflated gas bag of FIG. 8a.

FIG. 9a is a top view of an unfolded gas bag having a check strip which has the shape of a double trapezoid.

FIG. 9b is a side view of the check strip according to FIG. 9a.

FIGS. 9c and 9d are cross-sectional views of the inflated gas bag of FIG. 9a.

FIG. 10a is top view of an unfolded gas bag having a check strip which has the shape of a double trapezoid.

FIG. 10b is a side view of the check strip according to FIG. 10a.

FIGS. 10c and 10d are cross-sectional views of the inflated gas bag of FIG. 10a.

FIGS. 11a–11e are views of different embodiments of FIG. 10a.

FIG. 12a is atop view of an unfolded gas bag having two check strips of different shapes.

FIGS. 12b and 12c are side views of the check strips according to FIG. 12a.

FIGS. 12d and 12e are cross-sectional views of the inflated gas bag of FIG. 12a.

DETAILED DESCRIPTION OF THE INVENTION

Figure 1:
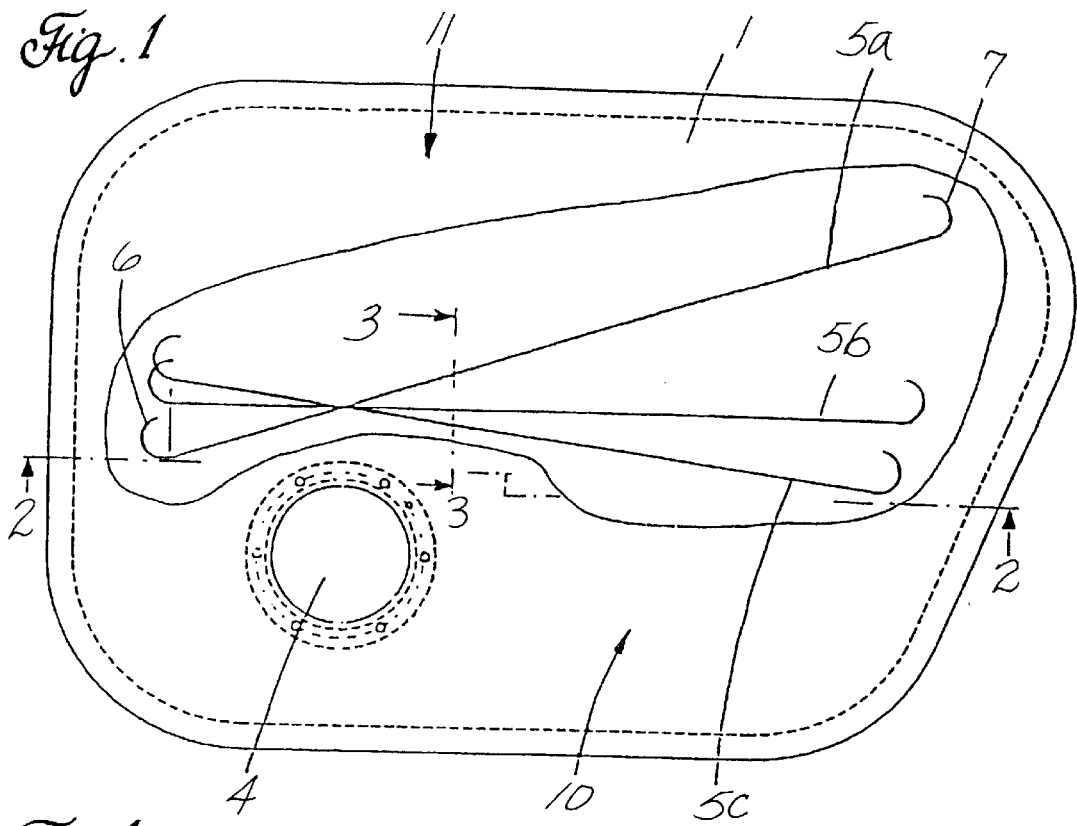
FIG. 1 is a partial cutaway view of the bottom of an unfolded gas bag.
Figure 2:
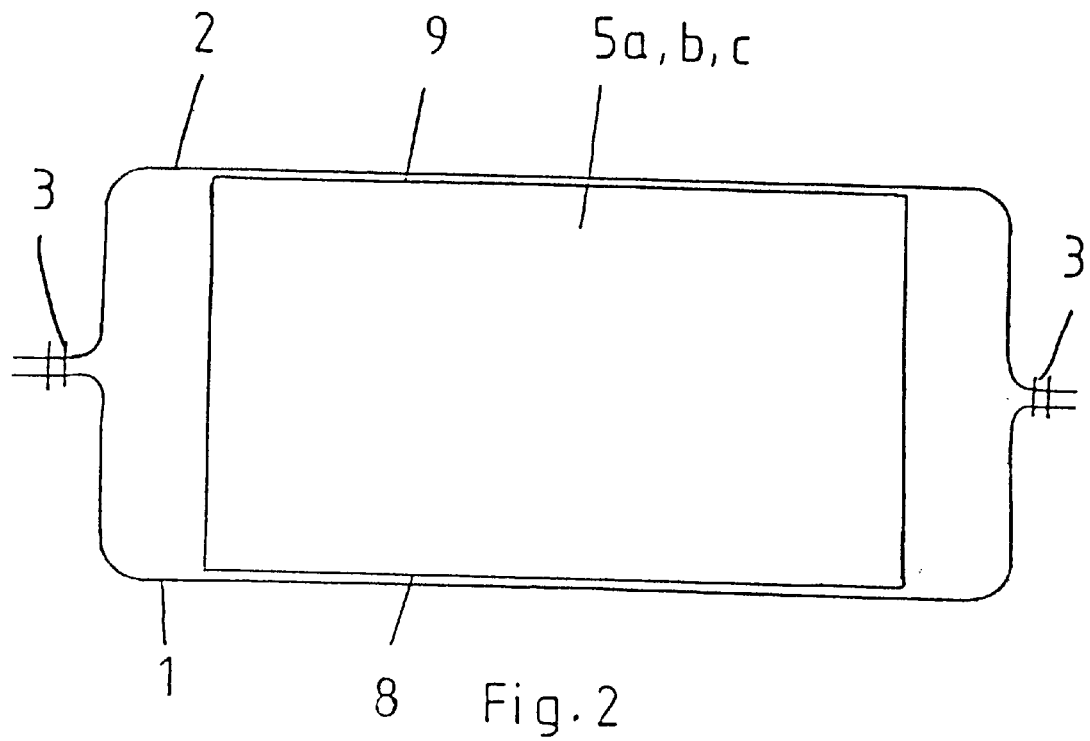
FIG. 2 is a cross-sectional view along line 2—2 of FIG. 1.
Figure 3:
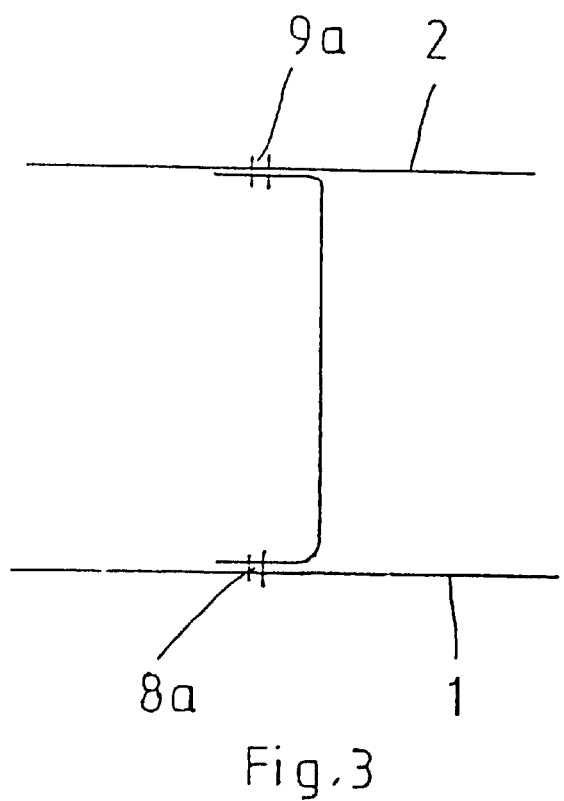
FIG. 3 is a cross-sectional view along line 2—2 of FIG. 1.

The gas bag according to FIGS. 1–3 consists of a lower part or side 1 having a lower surface and an upper part or side 2 having an upper surface, which are connected to each other at their edges (peripheries) at seam 3. The lower surface is provided with an inflation aperture 4, which is connected to a gas generator 4a. Between the lower surface and the upper surface, a check strip 5a runs transversely through the gas bag. Other examples of check strips, in place of 5a, are indicated by phantom lines at 5b and 5c. The check strip may run in a straight line. The ends 6, 7 of the check strip are preferably curved. The check strip is connected, preferably by sewing, with its upper edge 9 to the upper surface of the gas bag and with its lower edge 8 to the lower surface of the gas bag. The check strip is preferably continuously attached to the gas bag, with the upper edge 9 of the check strip continuously attached to the upper surface of the gas bag, and the lower edge 8 of the check strip continuously attached to the lower surface of the gas bag. The sewing of the continuous check strip is simpler than the sewing of a plurality of individual check strips located in proximity to each other. Other types of attachment, such as gluing, are easily implementable.

The check strip subdivides the gas bag into two chambers 10, 11 which communicate with each other around both ends of the check strip, since the check strip does not extend all the way to the periphery of the gas bag. As a result of this subdivision, the gas bag is inflated first in the region of the chamber 10 through the inflation aperture 4, while inflation of the region of the chamber 11 is delayed.

The inflation of the gas bag is influenced by the relative size relationship of the chambers. This size relationship is influenced by the different positions of the check strip relative to the gas bag as depicted in FIG. 1. By varying the angular position of the check strip 5a, 5b, or 5c in FIG. 1, not only is the size relationship of the chambers altered, but the shape of each individual chamber is also changed. For example, by using check strip 5a, the chamber 10 is larger in its right region than in its left region, whereas these regions are the same size with check strip 5b. In contrast, by attaching check strip 5c, the left region of the chamber 10 is larger than its right region. The shape of the chamber 11 changes accordingly in the opposite direction, i.e., enlarged regions of the chamber 10 are accompanied by reduced regions of the chamber 11.

Figure 4:
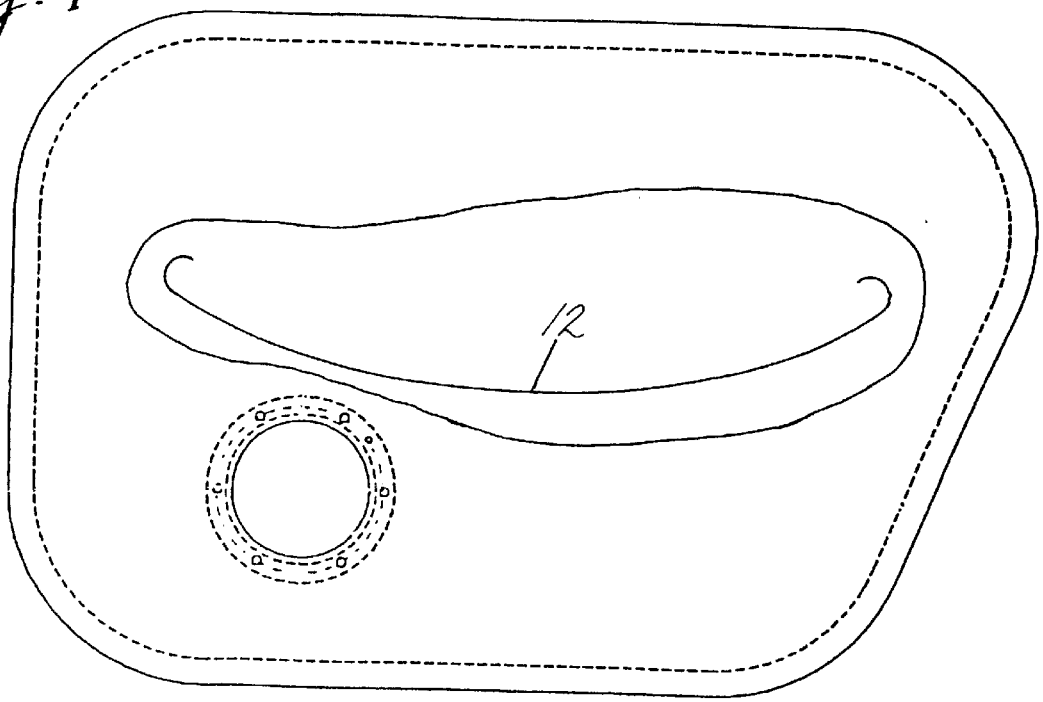
FIGS. 4–6 are partial cutaway views of the bottom of an unfolded gas bag having a check strip attached along various paths.

An additional possibility for influencing the size relationship of the chambers is depicted in FIG. 4. There, a check strip 12, which has a curved path, is provided. Thus, it is possible for the center region of the chambers to have a different size that its side regions.

Figure 5:
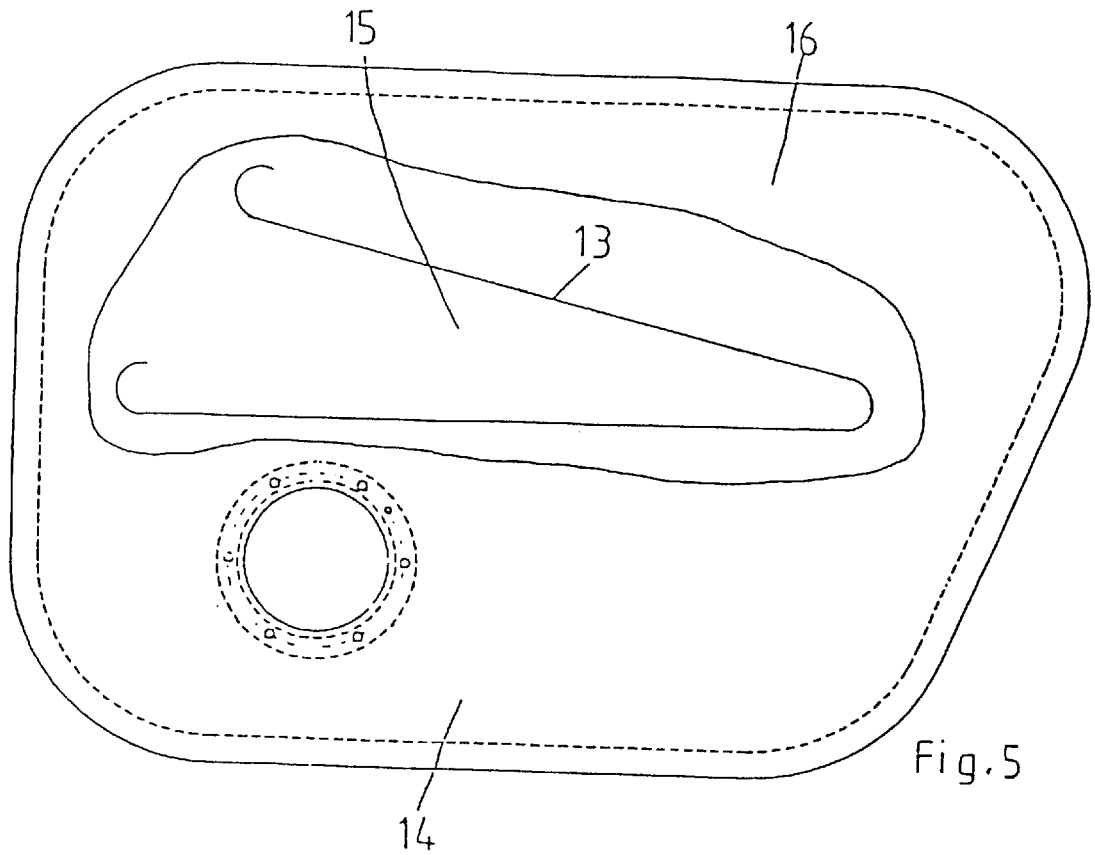

Whereas in the embodiments discussed, the gas bag was subdivided into two chambers, FIG. 5 depicts an embodiment in which the check strip subdivides the gas bag into three chambers. To accomplish this, the check strip 13 is attached to the gas bag along a V-shaped path with its ends and corner spaced from the airbag periphery to leave a gap for the gas to pass between chambers. Consequently, the gas bag is subdivided into three chambers 14, 15 and 16. By means of the division of the gas bag into three chambers, a finer gradation of the delayed inflation of specific regions of the gas bag can be obtained.

Figure 6:
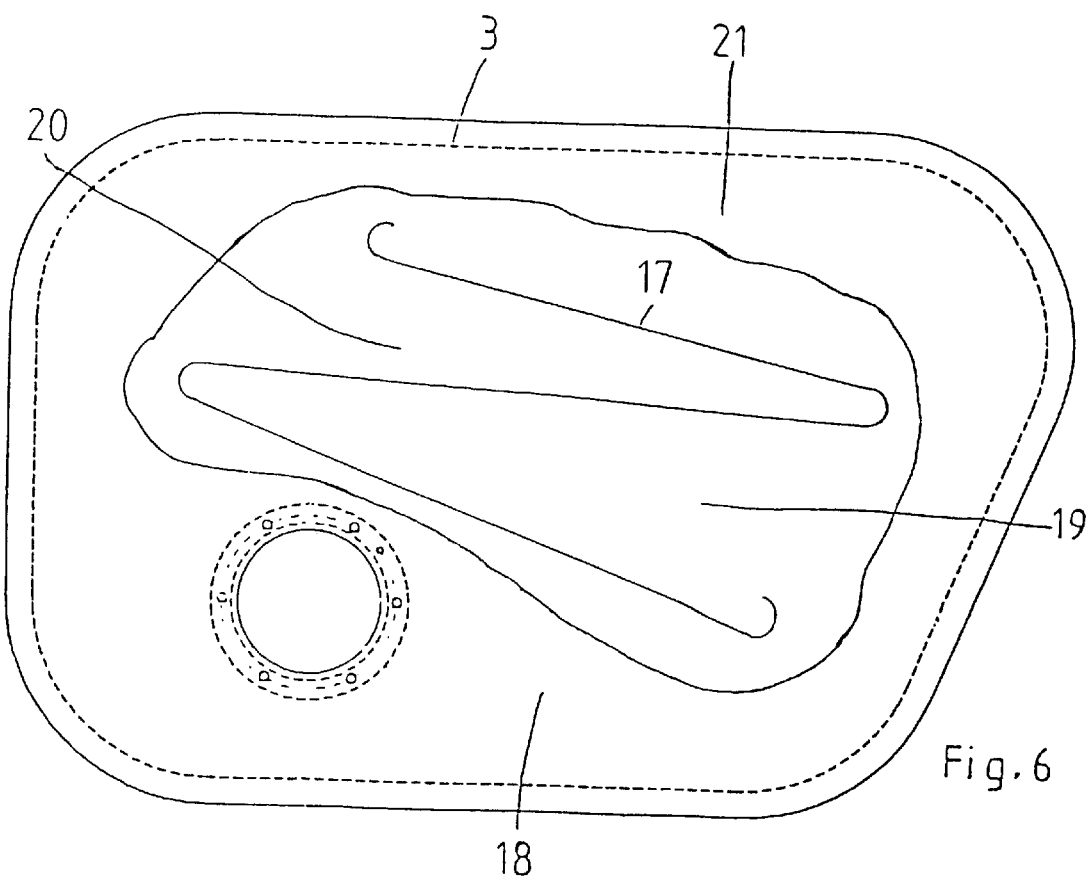

In an alternative embodiment, a check strip 17 is attached to the gas bag along a zig-zag path as depicted in FIG. 6. In this regard, it is possible to obtain even a more extensive subdivision of the gas bag and thus an even finer gradation of the delayed inflation of the specific regions of the gas bag. Exemplary of this embodiment are four chambers 18 through 21 depicted in FIG. 6. As it can be seen from the exemplary embodiments, a subdivision of the gas bag into different chambers is possible with only one check strip.

Figure 7:
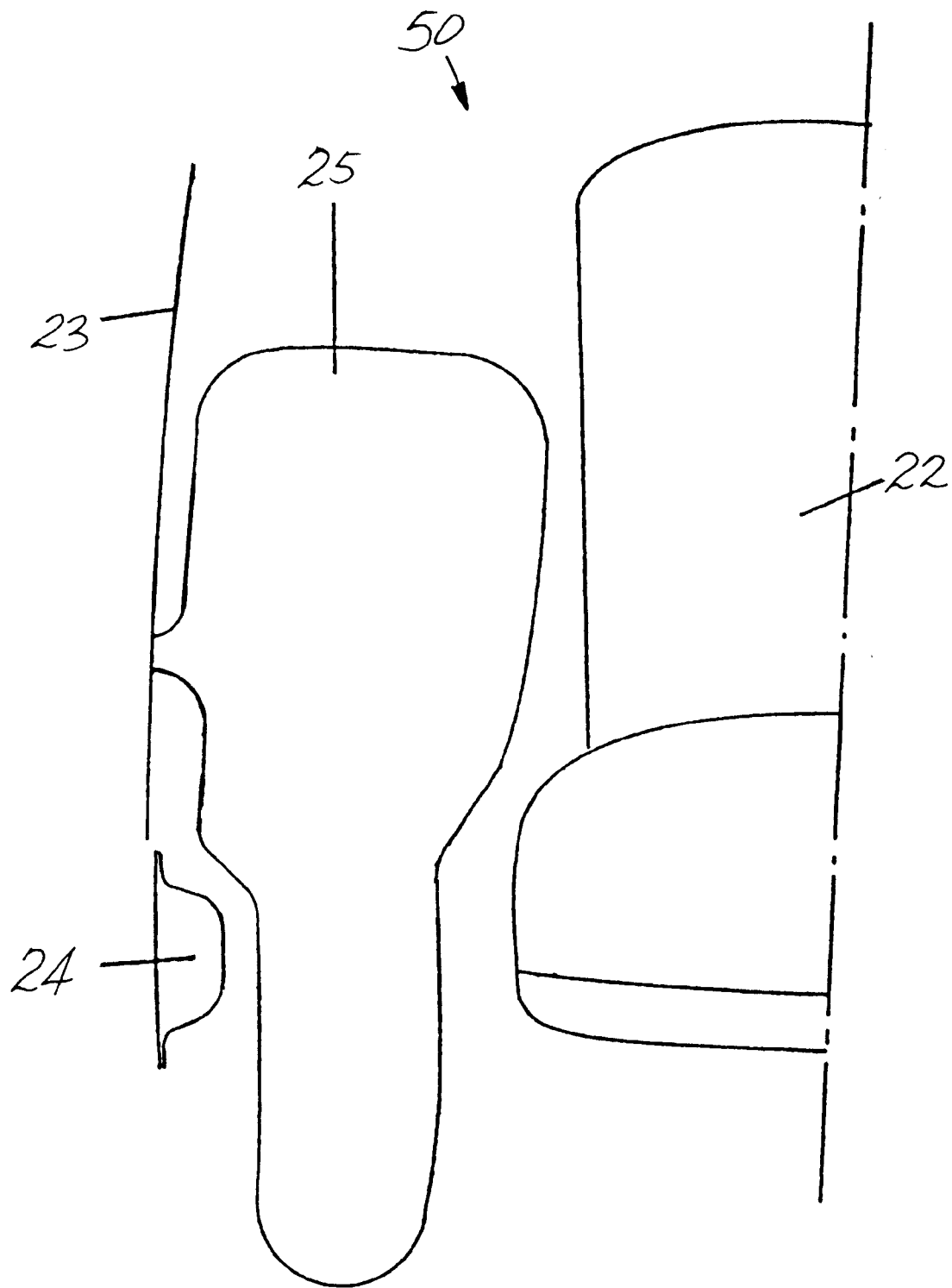
FIG. 7 is a schematic depiction of a motor vehicle depicting a top plan view of a driver's seat with an inflated side gas bag.

Using the check strips as described, allows for the tailoring of the shape of the inflated gas bag so that it can be adapted to its structural surroundings. For example, in the motor vehicle 50 of FIG. 7, a driver's seat 22, a door 23, and the center pillar 24 are shown along with an inflated gas bag 25, which extends out from the door and which is adapted to its structural surroundings. From FIG. 7, it is possible to see that the gas bag is wider in the door region than between the center pillar and the seat. This and other shapes of the gas bag may be obtained with the check strips provided as partitions in the following exemplary embodiments. In FIG. 7, the check strip 25a extends in a longitudinal direction between the front of the motor vehicle at the top of the figure and the rear of the motor vehicle at the bottom of the figure and is connected to the upper surface 25b and lower surface 25c of the gas bag 25. The ends 25d and 25e curve into the paper as seen in the figure toward a chamber formed on the opposite side of check strip 25a from that seen in FIG. 7. Gaps 25f and 25g are formed between the ends and the periphery of the airbag.

In the exemplary embodiment of FIGS. 8a through d, a gas bag 26 is depicted in which one check strip 27 is provided. This strip has a trapezoidal shape, i.e., the upper and lower edges 27a, 27b, run in different directions, as may be seen in FIG. 8b. The check strip is cut to this shape. Consequently, when in the inflated state, the gas bag is wider at the interface 8e—8e than at the interface 8d—8d, as can be seen in FIGS. 8c and 8d, respectively.

In the exemplary embodiment of FIGS. 9a through d, a gas bag 26 is provided with a check strip 28 which has the shape of a double trapezoid, i.e., the shape of two identical opposite trapezoids having a common parallel side. In this embodiment, the common side is the wide parallel side 29 of the trapezoids. Thus, the check strip becomes narrower from the center out toward its ends. Consequently, in the inflated state, the gas bag is wider at the interface 9c—9c than at the interfaces 9d—9d, as can be seen in FIGS. 9c and 9d, respectively.

FIG. 10a through 10d depict an exemplary embodiment in which the check strip 30 likewise has the shape of a double trapezoid. However, with this embodiment, the two trapezoids have their narrower side 31 as the common side. Thus, the check strip becomes wider from the center out toward its ends. Consequently, in the inflated state, the gas bag is narrower at the interface 10d—10d than at the interfaces 10c—10c, as can be seen in FIGS. 10c and 10d, respectively.

Figure 11D:
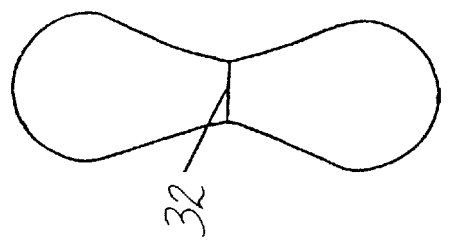
Figure 11C:
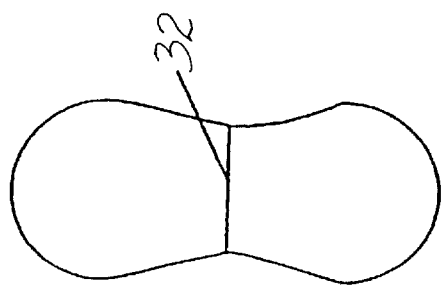
Figure 11E:
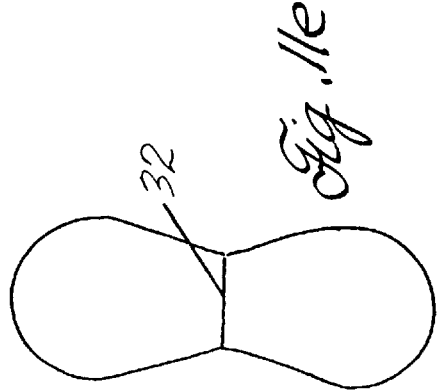
Figure 11A:
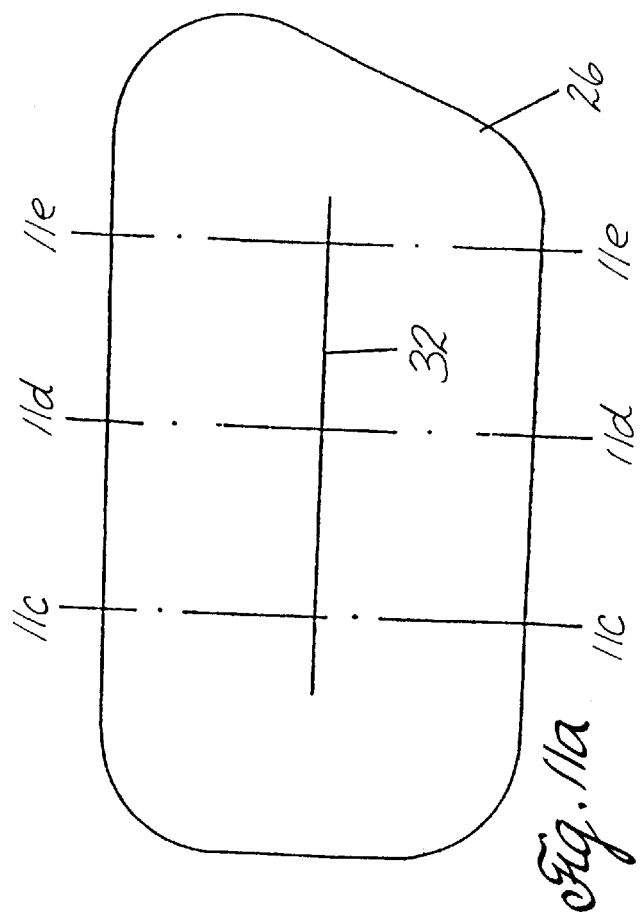
Figure 11B:
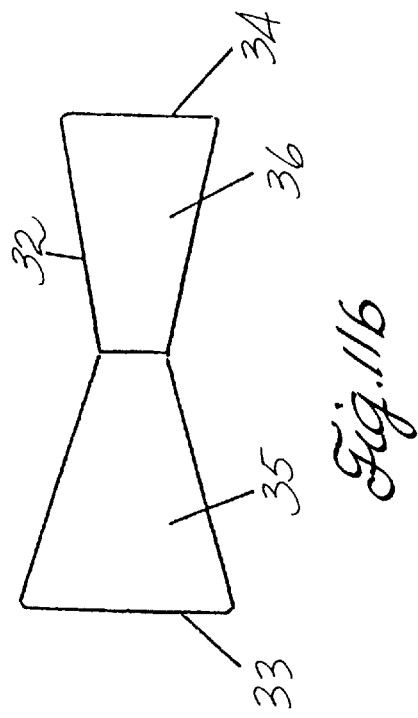

A further embodiment of the exemplary embodiment is shown in FIGS. 11a–11d. With this embodiment, the trapezoids forming the double trapezoid shape are not identical, i.e., in FIGS. 11a–11e, the double trapezoidal check strip 32 has ends 33, 34 with different widths, such that the check strip has different shaped sections 35, 36. As a result, in the inflated state, the gas bag has different widths at the interfaces 11c—11c and 11e—11e, as can be seen in FIGS. 11c and 11e, respectively.

Finally, FIG. 12a through 12e depict an exemplary embodiment with two check strips 37, 38, which have different shapes. Here, the check strip 37 corresponds to the check strip 28 of FIG. 9b and the check strip 38 corresponds to the check strip 30 of FIG. 10b. As can be seen in FIG. 12d and 12e, the inflated gas bag has a different cross-sectional shape in the center as well as on the ends.

The exemplary embodiments depicted show by way of example the possibilities for influencing gas bag geometry by means of the check strips according to the invention. Obviously, any other shapes of the check strips are possible.

Having now described the invention as required by the patent statutes, those skilled in the art will recognize modifications and substitutions to the elements of the embodiments disclosed herein.

We claim:

1. A gas bag having an interior chamber which is inflatable by means of a filling device, the gas bag comprising:
   a first side of the chamber;
   a second side of the chamber, the chamber having a periphery between the sides; and
   a check strip having first and second edges between a first and a second end of the check strip,
   wherein the first edge is attached to the first side of the gas bag and the second edge is attached to the second side of the gas bag,
   wherein the ends of the check strip do not extend to the periphery of the interior chamber, thereby subdividing the interior chamber into a plurality of chambers which communicate with each other,
   wherein the check strip has a trapezoidal shape,
   wherein the first edge of the trapezoidal shaped check strip is not parallel to the second edge of the trapezoidal shaped check strip, and
   wherein the first end of the check strip is parallel to the second end of the check strip.

2. The gas bag of claim 1, wherein the first and second edges are longer side edges.

3. The gas bag according to claim 2 wherein the check strip is continuously attached to the gas bag along its longer side edges.

4. The gas bag according to claim 2 wherein the longer side edges of the check strip are attached along a curved path to the gas bag.

5. The gas bag according to claim 2 wherein the plurality of chambers comprises at least three chambers.

6. The gas bag according to claim 2 wherein the longer side edges of the check strip are attached to the gas bag along a zig-zag path.

7. The gas bag according to claim 2 wherein the longer side edges of the check strip are attached along a V-shaped path to the gas bag.

8. The gas bag according to claim 1 wherein the first side and the second side are a first planar-shaped part and a second planar-shaped parts respectively, between which the check strip extends and to which the check strip is coupled.

9. The gas bag according to claim 1 wherein the check strip is curved at its ends.

10. The gas bag according to claim 1 further comprising an opening for a filling device,
    wherein the gas bag is adapted for use in a motor vehicle having a longitudinal direction,
    wherein the check strip extends in the longitudinal direction of the motor vehicle,
    wherein the first side of the chamber is coupled to the filling device, and
    wherein the ends of the check strip are curved toward the second side of the chamber.

11. The gas bag of claim 1 wherein the edges of the check strip are attached to the gas bag sides along a straight line between the ends of the check strip.

12. A gas bag having an interior chamber which is inflatable by means of a filling device, the gas bag comprising:
    a first side of the chamber;
    a second side of the chamber, the chamber having a periphery between the sides; and a first check strip having first and second longer edges between a first and a second end of the first check strip, a second check strip having first and second longer edges between a first and a second end of the second check strip, wherein the first edge of the first check strip is attached to the first side of the gas bag and the second edge of the first check strip is attached to the second side of the gas bag, wherein the ends of the first check strip do not extend to the periphery of the interior chamber, thereby subdividing the interior chamber into a plurality of chambers which communicate with each other, and wherein the first edge of said second check strip is attached to the first side of the gas bag, and the second edge of the second check strip is attached to the second side of the gas bag, wherein the second check strip has a different shape than the first check strip.

13. The gas bag of claim 12 wherein the ends of the second check strip do not extend to the periphery of the interior chamber.

14. The gas bag of claim 13 wherein the edges of at least one of the first and second check strips are attached to the gas bag sides along a straight line between the ends of the check strip.

15. A gas bag which is inflatable by means of a filling device, comprising at least two chambers connected with each other, and at least one check strip provided as a wall between the at least two chambers, the at least one check strip having ends between longer side edges and being attached on one each of the longer side edges to opposite surfaces of the gas bag, wherein, in an inflated state of the gas bag, the side edges of the at least one check strip are attached to the gas bag surfaces along a course running at least partially deviating from a straight line, wherein the ends of the at least one check strip are spaced from the gas bag, and wherein the at least one check strip has a trapezoidal shape and the non-parallel sides of the trapezoidal shape are connected to the gas bag.

16. A gas bag which is inflatable by means of a filling device and has opposed faces, the gas bag comprising:

at least two chambers which communicate with one another, and a plurality of check strips provided as walls between the at least two chambers, each of the plurality of check strips having a pair of opposed longer side edges, each of which is coupled to a respective one of the opposed faces of the gas bag, wherein the plurality of check strips comprises a first check strip and a second check strip, the first check strip having a different shape than the second check strip.

17. The gas bag according to claim 16 wherein at least one of the plurality of check strips has a double trapezoidal shape with a first section of the at least one check strip comprising a first trapezoid having a pair of non-parallel sides and a pair of parallel sides, and a second section of the at least one check strip comprising a second trapezoid having a pair of non-parallel sides and a pair of parallel sides, wherein the first trapezoid and the second trapezoid share a common parallel side, and wherein the non-parallel sides of the trapezoids are coupled to the gas bag.

18. The gas bag according to claim 16 wherein the opposed faces are a first planar-shaped part and a second planar-shaped part between which the plurality of check strips extend and to which each of the plurality of check strips is coupled.

19. The gas bag according to claim 16 wherein at least one of the plurality of check strips comprises a first end and a second end, and wherein the at least one check strip is curved at its ends.

20. The gas bag according to claim 16 wherein at least one of the plurality of check strips is continuously attached to the gas bag along its longer side edges.

21. The gas bag according to claim 16 wherein at least one of the plurality of check strips comprises a first side edge and a second side edge, and wherein a dimension between the first side edge and the second side edge varies along a length of the check strip.

22. The gas bag according to claim 16 wherein the at least two chambers comprises at least three chambers.

23. The gas bag according to claim 16 wherein the longer side edges of at least one of the plurality of check strips are attached along a V-shaped path to the gas bag.

24. The gas bag according to claim 16 wherein at least one of the plurality of check strips comprises a first side edge and a second side edge, and wherein the first side edge is not parallel to the second side edge.

25. The gas bag of claim 16 wherein the plurality of check strips includes a first and second check strip, each having first and second ends, and wherein the first and second ends of the first check strip are spaced from the gas bag.

26. The gas bag of claim 25 wherein the first and second ends of the second check strip are spaced from the gas bag.

* * * * *

UNITED STATES PATENT AND TRADEMARK OFFICE
CERTIFICATE OF CORRECTION

PATENT NO. : 6,032,977
DATED : March 7, 2000
INVENTOR(S) : Stefan Reh; Norbert Müller; Ulrich Tachaschke;
Bernhard Holzapfel It is certified that error appears in the above-identified patent and that said Letters Patent is hereby corrected as shown below:

On the title page, Item [73] Assignee, the Assignee should read:
-- Petri AG, Aschaffenburg, and
Daimler-Chrysler Aktiengesellschaft,
Stuttgart, both of Germany --

Item [56] References Cited, under "U.S. Patent Documents" insert
-- 5,340,151  8/1994  Sato . . . . .280/743.1 --
Column 3, line 1, replace "strip used" with -- strip is used --.
Column 3, line 28, in "FIG. 3" replace "line 2—2" with -- line 3—3 --.
Column 3, line 49, replace "FIG. 10a is top view" with
-- FIG. 10a is a top view --.
Column 3, line 57, replace "FIG. 12a is atop view" with
-- FIG. 12a is a top view --.
Column 4, line 47, replace "that" with -- than --.
Column 4, line 49, after "chambers" insert a comma."
Column 5, line 27, replace "8e—8e" with -- 8c—8c --.
Column 6, line 45, replace "planar-shaped parts" with
-- planar-shaped part --.

Signed and Sealed this

Ninth Day of January, 2001

*Attest:*

Q. TODD DICKINSON

*Attesting Officer*   *Commissioner of Patents and Trademarks*

UNITED STATES PATENT AND TRADEMARK OFFICE
CERTIFICATE OF CORRECTION

PATENT : 6,032,977
DATED : March 7, 2000
INVENTOR(S) : Stefan Reh; Norbert Müller; Ulrich Tachaschke; Bernhard Holzapfel It is certified that error appears in the above-identified patent and that said Letters Patent is hereby corrected as shown below:

On the title page, item [22] filed, replace "Apr. 24, 1997" with
--Apr. 23, 1997--.

Signed and Sealed this

Fifteenth Day of May, 2001

*Attest:*

NICHOLAS P. GODICI

*Attesting Officer*     *Acting Director of the United States Patent and Trademark Office*